United States Patent
Koc et al.

(10) Patent No.: US 10,164,693 B2
(45) Date of Patent: Dec. 25, 2018

(54) REDUCTION OF BUFFER OVERFLOW

(71) Applicant: INTEL IP CORPORATION, Santa Clara, CA (US)

(72) Inventors: Ali Koc, Portland, OR (US); Satish Jha, Hillsboro, OR (US); Maruti Gupta, Portland, OR (US); Rath Vannithamby, Portland, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/782,783

(22) PCT Filed: Dec. 16, 2013

(86) PCT No.: PCT/US2013/075474
§ 371 (c)(1),
(2) Date: Oct. 6, 2015

(87) PCT Pub. No.: WO2014/182340
PCT Pub. Date: Nov. 13, 2014

(65) Prior Publication Data
US 2016/0057044 A1  Feb. 25, 2016

Related U.S. Application Data

(60) Provisional application No. 61/821,635, filed on May 9, 2013.

(51) Int. Cl.
*H04L 12/26* (2006.01)
*H04L 12/835* (2013.01)
(Continued)

(52) U.S. Cl.
CPC ......... *H04B 7/0417* (2013.01); *H04L 5/0053* (2013.01); *H04L 27/0008* (2013.01);
(Continued)

(58) Field of Classification Search
CPC .................... H04L 43/16; H04W 52/0216
(Continued)

(56) References Cited

U.S. PATENT DOCUMENTS

2007/0291673 A1  12/2007  Demirhan et al.
2009/0180414 A1*  7/2009  Maeda ................ H04B 7/2643
                                                                370/311
(Continued)

FOREIGN PATENT DOCUMENTS

CN        101361298 A      2/2009
CN        102761910 A     10/2012
(Continued)

OTHER PUBLICATIONS

Office Action dated Dec. 28, 2017, in CN Patent Application No. 201380075351.2, filed Dec. 16, 2013; 1 page.

*Primary Examiner* — Asad M Nawaz
*Assistant Examiner* — Jason A Harley
(74) *Attorney, Agent, or Firm* — Thorpe North & Western

(57) ABSTRACT

Technology for reducing buffer overflow at a Third Generation Partnership Project (3GPP) Serving Gateway (S-GW) is described. A buffer overflow message may be received, at an evolved node B (eNB) from the S-GW, indicating potential overflow of downlink information at an S-GW buffer. The downlink information may be stored at the S-GW buffer until a plurality of user equipments (UEs) awake from a low power mode during a discontinuous reception (DRX) sleep cycle. One or more UEs may be selected from the plurality of UEs according to predefined criteria, wherein the one or more UEs are in a connected mode. The DRX configurations of the one or more UEs may be modified in order to reduce the downlink information that is stored at the S-GW buffer, thereby reducing the potential for overflow at the S-GW buffer.

18 Claims, 7 Drawing Sheets

(51) Int. Cl.
*H04W 28/02* (2009.01)
*H04Q 11/04* (2006.01)
*H04B 7/0417* (2017.01)
*H04W 52/02* (2009.01)
*H04L 5/00* (2006.01)
*H04W 72/04* (2009.01)
*H04W 72/12* (2009.01)
*H04W 24/02* (2009.01)
*H04W 72/10* (2009.01)
*H04W 12/04* (2009.01)
*H04L 27/00* (2006.01)
*H04W 4/70* (2018.01)
*H04W 76/14* (2018.01)
*H04W 76/10* (2018.01)
*H04W 88/02* (2009.01)
*H04L 27/36* (2006.01)

(52) U.S. Cl.
CPC ............... *H04L 43/16* (2013.01); *H04W 4/70* (2018.02); *H04W 12/04* (2013.01); *H04W 24/02* (2013.01); *H04W 52/0209* (2013.01); *H04W 52/0216* (2013.01); *H04W 52/0229* (2013.01); *H04W 52/0235* (2013.01); *H04W 72/0406* (2013.01); *H04W 72/0413* (2013.01); *H04W 72/0453* (2013.01); *H04W 72/10* (2013.01); *H04W 72/12* (2013.01); *H04W 76/10* (2018.02); *H04W 76/14* (2018.02); *H04L 5/006* (2013.01); *H04L 27/362* (2013.01); *H04W 88/02* (2013.01); *Y02D 70/00* (2018.01); *Y02D 70/122* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/23* (2018.01); *Y02D 70/24* (2018.01)

(58) Field of Classification Search
USPC .......................................... 370/311; 455/572
See application file for complete search history.

(56) References Cited

U.S. PATENT DOCUMENTS

| | | | |
|---|---|---|---|
| 2009/0245108 A1* | 10/2009 | Wu | H04L 47/10 370/233 |
| 2010/0035602 A1* | 2/2010 | Doherty | H04W 48/16 455/425 |
| 2011/0205899 A1 | 8/2011 | Hosein | |
| 2013/0044674 A1 | 2/2013 | Teyeb et al. | |
| 2013/0045770 A1* | 2/2013 | Aschan | H04W 52/0216 455/522 |
| 2013/0083713 A1* | 4/2013 | Johansson | H04W 52/0225 370/311 |
| 2013/0223309 A1* | 8/2013 | Hsiao | H04W 28/14 370/311 |
| 2014/0161007 A1* | 6/2014 | Donthi | H04W 52/0216 370/311 |

FOREIGN PATENT DOCUMENTS

| | | |
|---|---|---|
| EP | 1499144 A1 | 1/2005 |
| WO | WO 2013/006339 A2 | 1/2013 |

\* cited by examiner

REDUCTION OF BUFFER OVERFLOW

RELATED APPLICATIONS

The present application claims priority to U.S. Provisional Patent Application No. 61/821,635, filed May 9, 2013, the entire specification of which is hereby incorporated by reference in its entirety for all purposes.

BACKGROUND

In general, machine-to-machine (M2M) communication or Machine Type Communication (MTC) may refer to technologies that allow wireless and wired systems to communicate with other devices without any human intervention. A user equipment (UE) equipped for MTC (also known as an MTC device) may include, for example, a sensor or meter to collect information. The UE can communicate via a mobile network (e.g., wireless, wired, hybrid) with an MTC application server (e.g., software program) that can use or request data from the UE.

The expansion of mobile networks (e.g., broadband wireless access networks, wide area networks) across the world, along with the increased speed/bandwidth and reduced power of wireless communication, has facilitated the growth of MTC. Although the amount of data sent by UEs equipped for MTC is very small, a large number of these devices connected to a wireless network and concurrently being used may increase a data load and overhead expense on a network.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
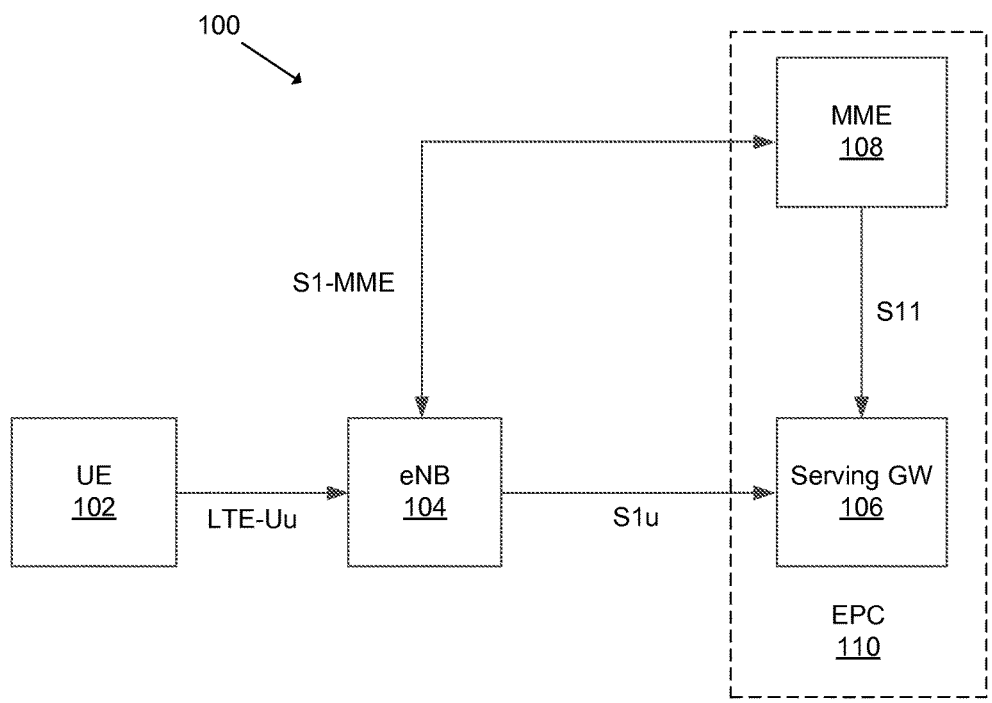
FIG. 1 is a block diagram illustrating a Third Generation Partnership Project (3GPP) Long Term Evolution (LTE) architecture in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

With a wide range of potential applications, Machine Type Communication (MTC) or Machine to Machine (M2M) communication has gained large interest among equipment vendors, mobile network operators, and MTC specialist companies. MTC is a form of data communication among one or more entities that does not necessarily need human interaction. Generally, a user equipment (UE) can be equipped for MTC. The UE equipped for MTC can also be known as an MTC device. The UE can communicate locally (e.g., wirelessly, through a personal area network (PAN), or hardwired) with other entities that provide the UE with data (e.g., a small data payload). Thereafter, the UE can process the data and then transmit the data to the MTC servers and/or other UEs that are equipped for MTC. The UEs can include health monitoring devices, smart meters, sensors, etc.

The UEs equipped for MTC can transmit (i.e., send or receive) small amounts of data over a network. The small amount of data typically ranges from a few bits to kilobits of data. The network can be a wireless wide area network (WWAN) or wireless local area network (WLAN) based on a selected radio access network (RAN) technology. The WWAN can be configured to operate based on a cellular networking standard such as IEEE 802.16 standard, commonly referred to as WiMAX (worldwide interoperability for microwave access), and the Third Generation Partnership Project (3GPP). Releases of the IEEE 802.16 standard include the IEEE 802.16e-2005, 802.16-2009, and 802.16m-2011. Releases of the 3GPP standard include the 3GPP Long Term Evolution (LTE) Release 8 in the fourth quarter of 2008, 3GPP LTE Advanced Release 10 in the first quarter of 2011, and 3GPP LTE Release 11 in the third quarter of 2012.

In one example, UE power consumption for MTC and other mobile Internet applications may be improved by modifying the discontinuous reception (DRX) configurations of the UEs equipped for MTC. As discussed in greater detail below, DRX can be used to enable a wireless device, such as the UE in a 3GPP LTE network, to discontinuously monitor a downlink control channel, such as the physical downlink control channel (PDCCH) communicated from a transmission station such as an enhanced node B (eNB). The discontinuous monitoring by using DRX can provide significant power savings at the UE since the receiver at the UE can be turned off for selected periods. In other words, the UE may go into a DRX sleep mode, or a low power mode, when the UE does not monitor the downlink control channel.

In one example, the UE power consumption may be improved by extending a DRX sleep cycle length of one or more UEs. In other words, the UE may "sleep" for a longer period of time (i.e., the UE does not monitor the downlink channel control for longer periods of time), thereby decreasing the UE's power consumption. The DRX sleep cycle length may be extended for UEs in either a connected mode or an idle mode (i.e., a low power mode). In 3GPP LTE Release 11, the maximum DRX sleep cycle length is 2.56 seconds. Thus, if the UE is performing DRX during the idle mode, the UE may adhere to a periodic DRX sleep cycle, wherein the UE can sleep for up to 2.56 seconds. In one configuration, the UE may sleep according to an extended DRX sleep cycle length (e.g., 10 seconds) in order to decrease the UE's power consumption. In general, the term "extended DRX sleep cycle length" may refer to a DRX sleep cycle length that is greater than 2.56 seconds.

After the UE sleeps for 2.56 seconds (or longer), the UE can wake up during an ON duration. During the ON duration, the UE can listen to the downlink control channel for the possible arrival of Internet Protocol (IP) packets in the downlink. The IP packets may include a header and a payload. While the UE is sleeping according to the UE's periodic DRX sleep cycle, downlink IP packets for the UE are buffered at the network (e.g., at a serving gateway) until the next ON duration. In other words, the IP packets are buffered at the network until the UE wakes up during the next ON duration. The UE can listen to the downlink control channel for the possible arrival of the IP packets in the downlink. The IP packets that are buffered at the network may be delivered to the UE.

When the maximum DRX sleep cycle length is 2.56 seconds, the network may be adequate to buffer the IP packets until the UEs wake up from idle mode. However, if the DRX sleep cycle length increases to several minutes or even several hours (i.e., the UE sleeps according to the extended DRX sleep cycle length), the network may be unable to buffer all of the IP packets until the UEs wake up from idle mode. As the DRX sleep cycle length increases (e.g., from 2.56 seconds to 10 seconds), the amount of information to be buffered at the network may also increase. In other words, the extended DRX sleep cycle may result in an increased number of IP packets being buffered at the network. Thus, the network may be unable to handle the increased amount of information that is to be buffered, especially when a plurality of UEs equipped for MTC (e.g., thousands of UEs) are using extended DRX sleep cycle lengths simultaneously. Even if a single IP Packet in the order of 1 kilobyte (kB) is buffered at the network for each of the plurality of UEs (e.g., several thousand UEs) while the plurality of UEs are idle, the amount of information may exceed a buffer capacity of the network.

FIG. 1 is a block diagram illustrating an exemplary Third Generation Partnership Project (3GPP) Long Term Evolution (LTE) architecture 100. The 3GPP LTE architecture 100 may include at least one user equipment (UE) 102, evolved node B (eNB) 104, serving gateway (S-GW) 106, and mobility management entity (MME) 108. The S-GW 106 and the MME 108 may be included in an evolved packet core (EPC) 110. In one example, the UE 102 may be equipped for machine type communication (MTC). The radio interface between the UE 102 and the eNB 104 is the LTE-Uu interface. Thus, the LTE-Uu interface may handle the signaling between the UE 102 and the eNB 104.

The eNB 104 may connect with the EPC 110 through the S1 interface. The S1 interface may include the S1-MME interface for the control plane and S1-U interface for the user plane. In other words, control signaling between the eNB 104 and the MME 108 may be handled by the S1-MME interface, and user data between the eNB 104 and the S-GW 106 may be handled by the S1u interface. In addition, control signaling between the S-GW 106 and the MME 108 may be handled by the S11 interface.

In one example, the S-GW 106 may buffer the downlink IP packets when the UE 102 is idle. In other words, the S-GW 106 may store the downlink IP packets (or downlink information) when the UE 102 is in a low power mode during the extended DRX sleep cycle (e.g., a period of 30 seconds). The S-GW 106 may buffer the downlink IP packets until the UE 102 wakes up from idle mode (i.e., the low power mode) during the ON duration. In addition, the S-GW 106 may initiate network triggered service requests.

In one configuration, the increased amount of information that is buffered at the S-GW 106 due to the extended DRX sleep cycle lengths (e.g., 30 seconds as opposed to 2.56 seconds) may cause a potential overflow at an S-GW buffer within the S-GW 106. In addition, the potential overflow at the S-GW buffer may be caused by the increased number of UEs and the simultaneous use of the extended DRX sleep cycle lengths. The number of UEs that are simultaneously using the extended DRX sleep cycle lengths could potentially be in the range of thousands of UEs. In addition, the potential for buffer overflow at the S-GW may increase when the S-GW is suddenly faced with a high volume of connected users. As a result, the S-GW 106 may drop IP packets, and hence, the IP packets may not be received at the UE 102 when the UE 102 wakes up from idle mode. The loss of IP packets at the UE may degrade a user's experience. As explained in greater detail below, the DRX configurations of one or more UEs (e.g., the DRX sleep cycle length) may be modified in order to reduce the potential for buffer overflow at the S-GW 106.

Figure 2A:
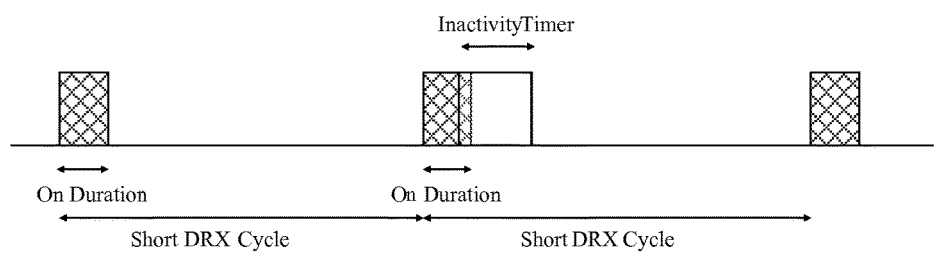
FIG. 2A illustrates a block timing diagram that includes a short discontinuous reception (DRX) cycle in accordance with an example.
Figure 2B:
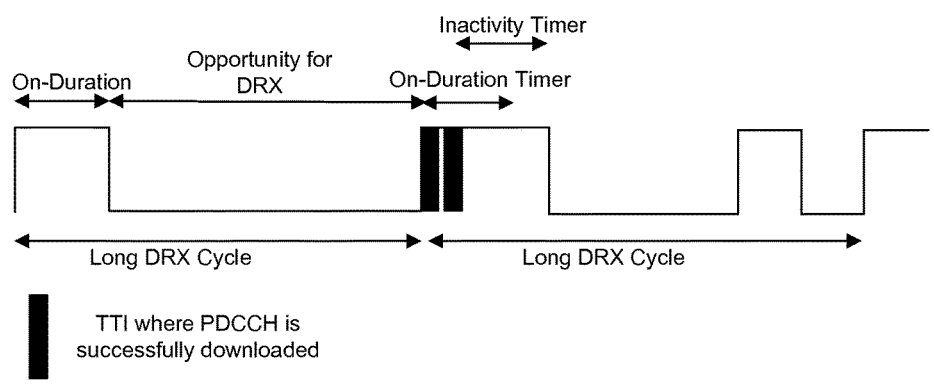
FIG. 2B illustrates a block timing diagram that includes a long DRX cycle in accordance with an example.

FIGS. 2A and 2B are block timing diagrams for discontinuous reception (DRX) short cycles and DRX long cycles, respectively. The UE can be set in either an RRC_IDLE or an RRC_CONNECTED state to extend battery life while still guaranteeing a high quality of service (QoS) and connectivity speed. The 3GPP LTE implementation allows the UE to reduce the amount of time spent monitoring a control channel, such as the PDCCH, for control channel information. Rather than monitoring the PDCCH every transmission time interval (TTI), the UE can monitor the PDCCH only during specific time intervals set through the RRC communication. An Active Time is a time related to DRX operation during which the UE monitors the PDCCH in PDCCH-subframes. This solution can provide benefits in both the downlink and uplink because all of the scheduling control information is transmitted on the PDCCH. During non-active states, the UE can be configured to enter a power saving state that can significantly decrease the power consumption of the LTE configured radio frequency modem at the UE.

The RRC signaling can be used to manage the use of DRX by setting various parameters. Examples of parameters that can be set in the RRC_CONNECTED state are illustrated in FIG. 2A. The DRX parameters may include, but are not limited to, DRX Cycle, On Duration timer, DRX Inactivity timer, DRX Short Cycle, and/or Short DRX Cycle timer.

The DRX Cycle may identify the periodic repetition of an active period, identified as an "On Duration", followed by a possible period of inactivity. There is a DRX Long cycle and a DRX Short cycle. The On Duration timer may identify how many subframes the UE is in an active state when a new DRX cycle starts (at the beginning of a DRX cycle). The UE will listen to the PDCCH subframes during this time even if there is no data transfer. The DRX Inactivity timer may identify for how many consecutive PDCCH subframes the UE is to remain active after successfully decoding a PDCCH. The DRX Short Cycle may identify a periodic repetition of an active state when the UE is under a short DRX condition. The Short DRX Cycle timer may specify a consecutive number of subframes the UE will follow the short DRX cycle after the DRX inactivity timer has expired.

When the network configures DRX for a UE, a value is defined for the DRX Inactivity Timer, referred to in the 3GPP LTE Technical Specification (TS) 36.321 as a drx-Inactivity Timer that starts running after each data block has been sent. If new data is sent then the timer is restarted. If still no data is sent when the timer expires then the device can enter a DRX mode with a short DRX cycle. This means that the UE will effectively sleep and awake in a relatively short pattern based on the short DRX cycle. If new data is received then it can be received relatively quickly since the UE only sleeps for short periods. The short DRX cycle mode also has a configurable short DRX cycle timer (i.e. drx-ShortCycleTimer) attached. Once this timer expires (i.e. no data is received during the short cycle mode), the UE can enter the long DRX cycle. The long DRX cycle can further reduce power usage, but also increases latency time.

During the inactivity periods, the UE may only check the control channels and resources may be assigned. In each DRX cycle (short and long), the RF modem can be turned on for a number of consecutive subframes set by the On Duration timer to listen to the control channel. When data activity is detected, in either the downlink or uplink, the eNB triggers the short DRX cycle for the UE, thereby increasing the responsiveness and connectivity of the UE. The transitions between the Long DRX Cycle and the Short DRC cycle may be triggered directly by the eNB or determined by a timer. Control channel information received on the PDCCH can identify resource blocks in which data is communicated to the UE, thereby enabling the UE to receive the data transmitted in the downlink.

The inactivity timer can specify the consecutive number of TTIs during which the UE will monitor the PDCCH after successfully decoding a PDCCH indicating an uplink or a downlink data transfer for the UE. The inactivity timer can keep the UE awake for a certain period during data transfer even if the on-duration timer has expired. In a downlink, the inactivity timer is usually triggered within an on-duration period. If the on-duration period is longer, the inactivity timer may start and expire within the awake period. In this example, the inactivity timer will not contribute to the average awake time of the terminal. The inactivity timer may only be triggered for new transmissions in both an uplink and downlink and not for retransmissions.

In the example illustrated in FIG. 2A, a short DRX cycle starts at the beginning of an On Duration and ends at the beginning of the next On Duration. An Inactivity Timer is shown overlapping an On Duration, as discussed in the preceding paragraph. FIG. 2B illustrates an example of a long DRX cycle. In this example, the long DRX cycle is shown relative to an On-Duration Timer, and an overlapping Inactivity Timer.

Figure 3:
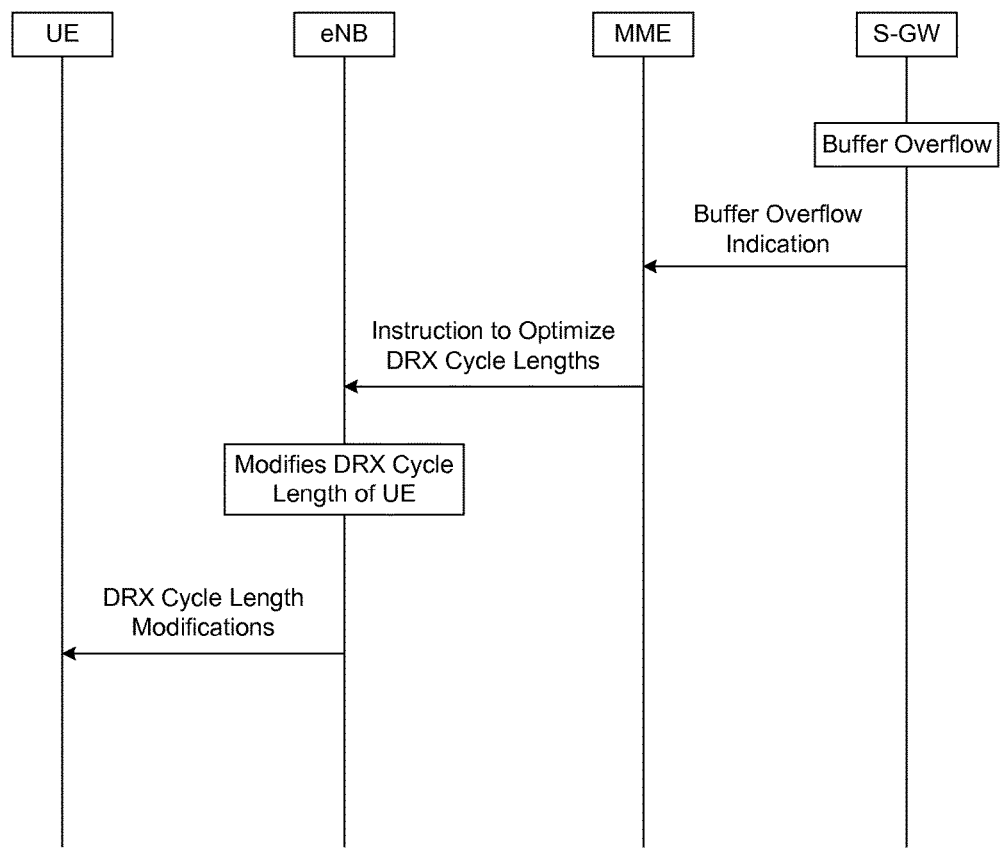
FIG. 3 illustrates a scheme for reducing a potential for buffer overflow at a serving gateway (S-GW) by instructing an evolved node B (eNB) to modify discontinuous reception (DRX) configurations for one or more user equipments (UEs) in accordance with an example.

FIG. 3 illustrates an exemplary scheme for reducing a potential for buffer overflow at the serving gateway (S-GW). As previously discussed, the S-GW may buffer the downlink IP packets for a plurality of UEs when the UEs are in the extended DRX sleep cycle length (e.g., 30 seconds). The downlink IP packets may be delivered to the UE when the UE wakes up from idle mode (i.e., the low power mode). The increased number of UEs that are equipped for MTC may increase the likelihood of buffer overflow at the S-GW. In other words, the S-GW may be unable to handle the amount of downlink information for the plurality of UEs. In one example, the likelihood of buffer overflow at the S-GW may increase when the DRX sleep cycle lengths of the UEs are increased. As a result of the UE being in an idle mode for a longer period of time, an increased amount of downlink information is buffered at the S-GW. Modifications to the DRX configurations associated with the UEs may reduce the downlink information that is stored at the S-GW buffer, thereby reducing the potential for overflow at the S-GW. In one example, the S-GW may decrease the DRX sleep cycle lengths (e.g., from 30 seconds to 2.56 seconds), via the eNB, in order to reduce the downlink information that is stored at the S-GW buffer.

The S-GW may determine that buffer overflow is likely to occur when an S-GW buffer capacity is greater than a predetermined threshold. In other words, the S-GW may determine that the buffer overflow is imminent when the amount of downlink information that is stored at the S-GW buffer exceeds the predetermined threshold. In one example, the S-GW buffer capacity may be greater than the predetermined threshold for reasons other than the extended DRX sleep cycle lengths of the UEs. The S-GW may communicate a buffer overflow message to a mobility management entity (MME) indicating the potential overflow at the S-GW buffer.

The MME may forward the buffer overflow message to the eNB. In addition, the MME may instruct the eNB to modify the DRX configurations of one or more UEs out of the plurality of UEs for a period of time to lower the buffering demand. For example, the MME may instruct the eNB to modify the DRX configurations of the one or more UEs until the risk of overflow at the S-GW buffer has substantially subsided. In one configuration, the MME may instruct the eNB to adjust (or limit) the extended DRX sleep cycle lengths or long DRX sleep cycle lengths of the one or more UEs in the plurality of UEs until the potential for buffer overflow at the S-GW has reduced. In one example, the MME may communicate, to the eNB, an indicator or instruction for the eNB to optimize (i.e., modify) the DRX sleep cycle length or other DRX configurations associated with the one or more UEs.

The eNB may receive the indication to modify the DRX configurations of the one or more UEs from the MME. In one example, the eNB may reduce the extended DRX sleep cycle length (e.g., 15 seconds) to a defined DRX sleep cycle length. The eNB may reduce the extended DRX sleep cycle length to the maximum DRX sleep cycle length of 2.56 seconds, as defined in 3GPP LTE Release 11. Alternatively, the eNB may reduce the extended DRX sleep cycle length to a time period other than 2.56 seconds. By reducing the DRX sleep cycle length, the amount of downlink information stored at the S-GW buffer when the UEs are sleeping may be decreased.

In one configuration, the eNB may select which of the one or more UEs in the plurality of UEs (i.e., a subset of the UEs) to modify the DRX configurations based on predetermined criteria. For example, the eNB may select the UEs that have the highest data rates or longest DRX sleep cycle lengths in relation to the plurality of UEs. The eNB may reduce the DRX sleep cycle lengths of the UEs with the highest data rates or the longest DRX sleep cycles. In addition, the eNB may select the one or more UEs to modify the DRX configuration based on criteria other than those UEs having the highest data rates and the longest DRX sleep cycle lengths.

In general, the eNB may modify the DRX configurations of UEs that are in a connected mode (as opposed to an idle mode). The eNB may be unable to modify the DRX configurations of UEs that are in idle mode because the UEs' extended DRX cycle lengths may render the UEs unavailable to receive the modified DRX configuration from the eNB. Thus, the eNB may wait until one or more UEs transition from the idle mode to the connected mode, upon which time the eNB may modify the DRX sleep cycle lengths of the one or more UEs that are in the connected mode.

In an alternative configuration, the eNB may modify the DRX configurations (e.g., reduce the DRX sleep cycle lengths) for the plurality of UEs, rather than a subset of UEs in the plurality of UEs. For example, the eNB may modify the DRX configurations for the plurality of UEs in response to receiving multiple buffer overflow messages with instructions to modify the DRX configurations of the UEs from the S-GW via the MME. The S-GW may communicate the multiple buffer overload messages to the eNB when the DRX modifications performed by the eNB have not significantly reduced the potential for buffer overflow at the S-GW. For example, the eNB may reduce the DRX sleep cycle lengths for the UEs from 30 seconds to 20 seconds, but if the potential for buffer overload has not substantially reduced, the eNB may further reduce the DRX sleep cycle length to 10 seconds. In addition, the multiple buffer overload messages with the instructions to modify the DRX configurations of the UEs may be communicated to the eNB within a defined time period (e.g., the S-GW may send three consecutive messages in a span of two minutes).

In an additional configuration, the eNB may modify the DRX configurations of one or more UEs to prevent the one or more UEs from entering into a DRX sleep mode (or a low power mode). For example, the eNB may modify the DRX configurations of UEs that are in a connected state to prevent the UEs from entering into the DRX sleep mode. The eNB may prevent the UEs from entering into the DRX sleep mode in order to reduce the amount of downlink information stored at the S-GW buffer. As a result, a fewer number of UEs may be allocated for having a DRX configuration. After a period of time (e.g., when the potential for buffer overflow has subsided), the UEs may be able to enter the DRX sleep mode.

As previously discussed, the one or more UEs may have a decreased DRX sleep cycle length (or be unable to enter the DRX sleep mode) in response to the eNB modifying the DRX configurations of the one or more UEs. Upon receiving an indication from the S-GW that the risk for buffer overflow at the S-GW has substantially decreased, the eNB may reconfigure the DRX sleep cycle lengths of the UEs to a previous DRX configuration. For example, the DRX sleep cycle length of the UEs may be reduced from 30 seconds to 10 seconds when the potential for buffer overflow at the S-GW exceeds the predetermined threshold, but the DRX sleep cycle length may revert back to 30 seconds when the risk of buffer overflow has substantially subsided.

Figure 4:
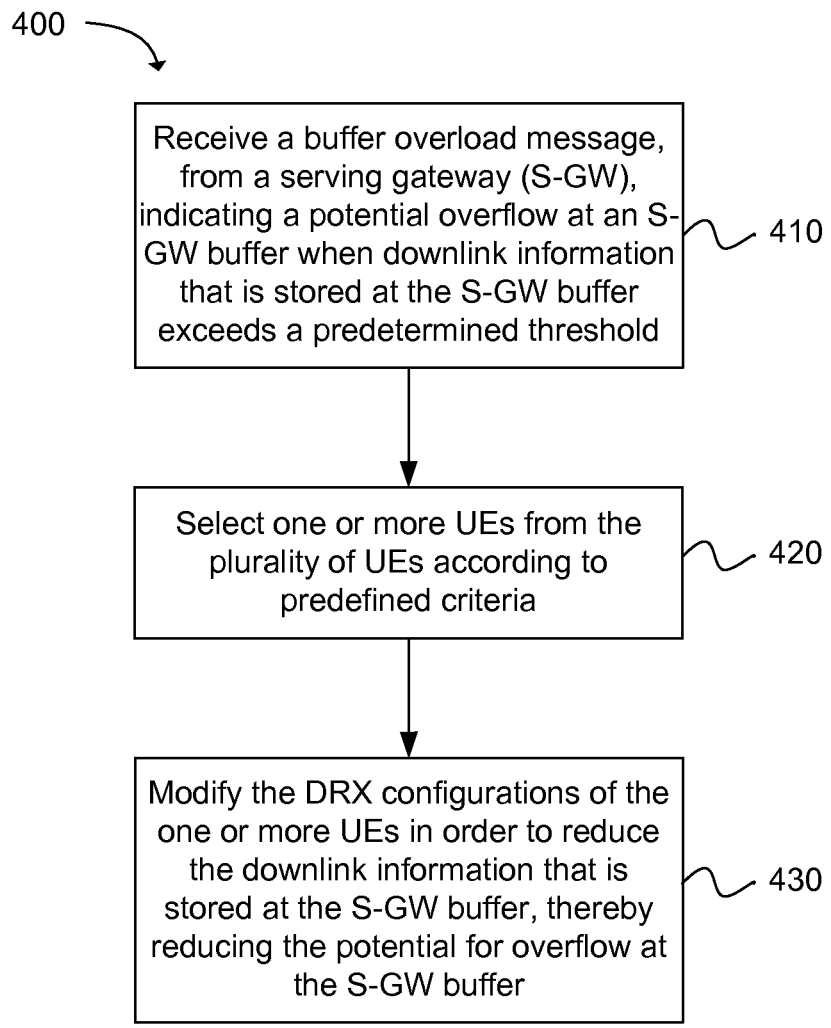
FIG. 4 depicts functionality of computer circuitry of a node operable to control discontinuous reception (DRX) configurations for a plurality of user equipments (UEs) in accordance with an example.
Figure 5:
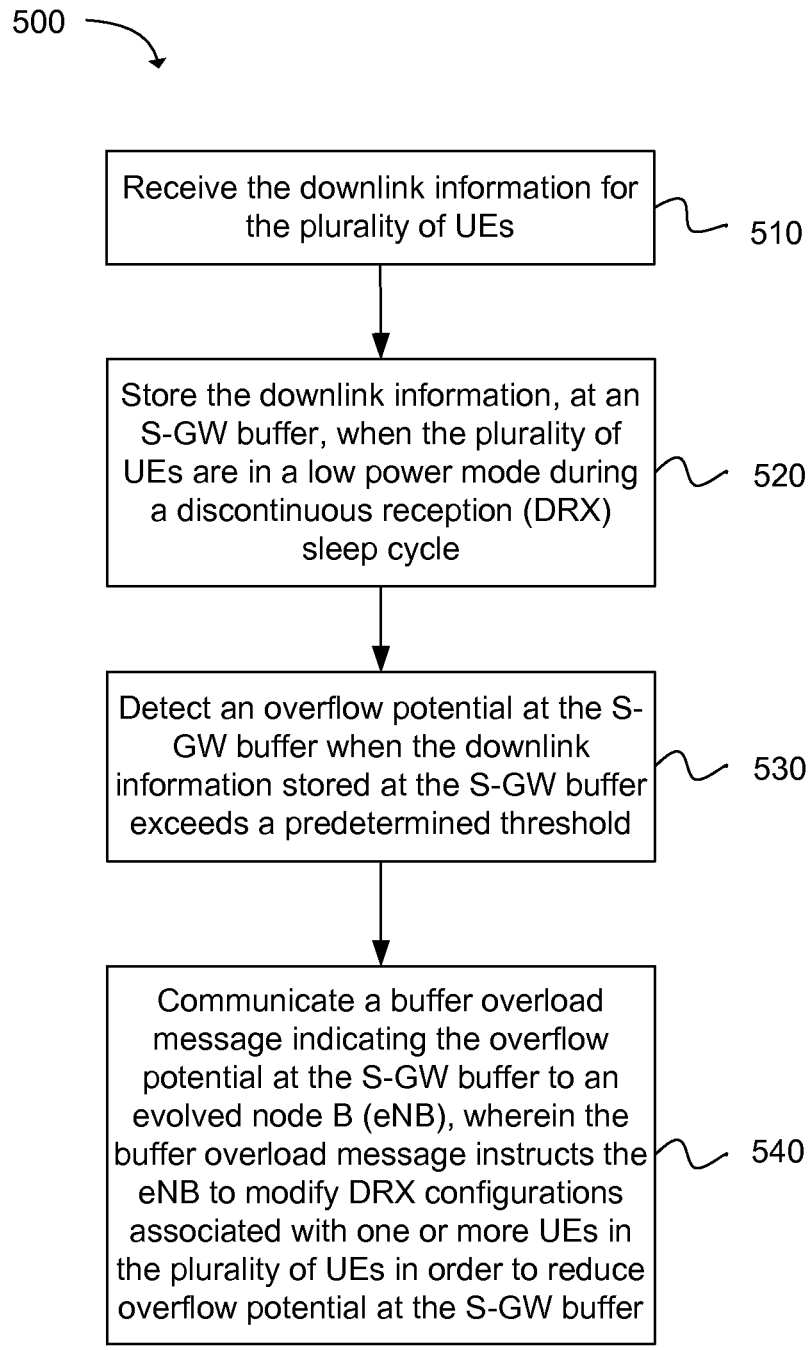
FIG. 5 depicts functionality of computer circuitry of a Third Generation Partnership Project (3GPP) serving gateway (S-GW) operable to buffer downlink information for a plurality of user equipments (UEs) in accordance with an example.

Another example provides functionality 400 of computer circuitry of a node operable to control discontinuous reception (DRX) configurations for a plurality of user equipments (UEs), as shown in the flow chart in FIG. 4. The functionality may be implemented as a method or the functionality may be executed as instructions on a machine, where the instructions are included on at least one computer readable medium or one non-transitory machine readable storage medium. The computer circuitry can be configured to receive a buffer overflow message, from a serving gateway (S-GW), indicating a potential overflow at an S-GW buffer when downlink information that is stored at the S-GW buffer exceeds a predetermined threshold, as in block 410. The computer circuitry can be further configured to select one or more UEs from the plurality of UEs according to predefined criteria, as in block 410. In addition, the computer circuitry can be configured to modify the DRX configurations of the one or more UEs in order to reduce the downlink information that is stored at the S-GW buffer, thereby reducing the potential for overflow at the S-GW buffer, as in block 430.

In one example, the downlink information is stored at the S-GW buffer until the UEs awake from a low power mode during a discontinuous reception (DRX) sleep cycle. In addition, the computer circuitry can be further configured to receive the buffer overflow message from the S-GW via a mobility management entity (MME). Furthermore, the computer circuitry can be configured to modify the DRX configurations of the one or more UEs by reducing a DRX sleep cycle length of the one or more UEs.

In one configuration, the computer circuitry can be further configured to select the one or more UEs based on the predefined criteria of a highest data rate or a longest DRX sleep cycle length in comparison to the plurality of UEs. In addition, the computer circuitry can be further configured to modify the DRX configurations of the one or more UEs that are in a connected mode. In one example, the computer circuitry can be further configured to modify a DRX sleep cycle length of the one or more UEs when the UEs transition from the idle mode to the connected mode.

In one configuration, the computer circuitry can be further configured to prevent the one or more UEs from entering a low power mode during a DRX sleep cycle in response to receiving the buffer overflow message from the S-GW. In addition, the computer circuitry can be further configured to modify DRX sleep cycle lengths of the plurality of UEs in response to receiving multiple buffer overflow messages from the S-GW. The computer circuitry can be further configured to reconfigure DRX sleep cycle lengths of the one or more UEs to a previous DRX configuration in response to receiving an indication from the S-GW that the potential for overflow at the S-GW buffer has ended. In one example, the node is selected from a group consisting of a base station (BS), a Node B (NB), an evolved Node B (eNB), a baseband unit (BBU), a remote radio head (RRH), a remote radio equipment (RRE), or a remote radio unit (RRU).

Figure 6:
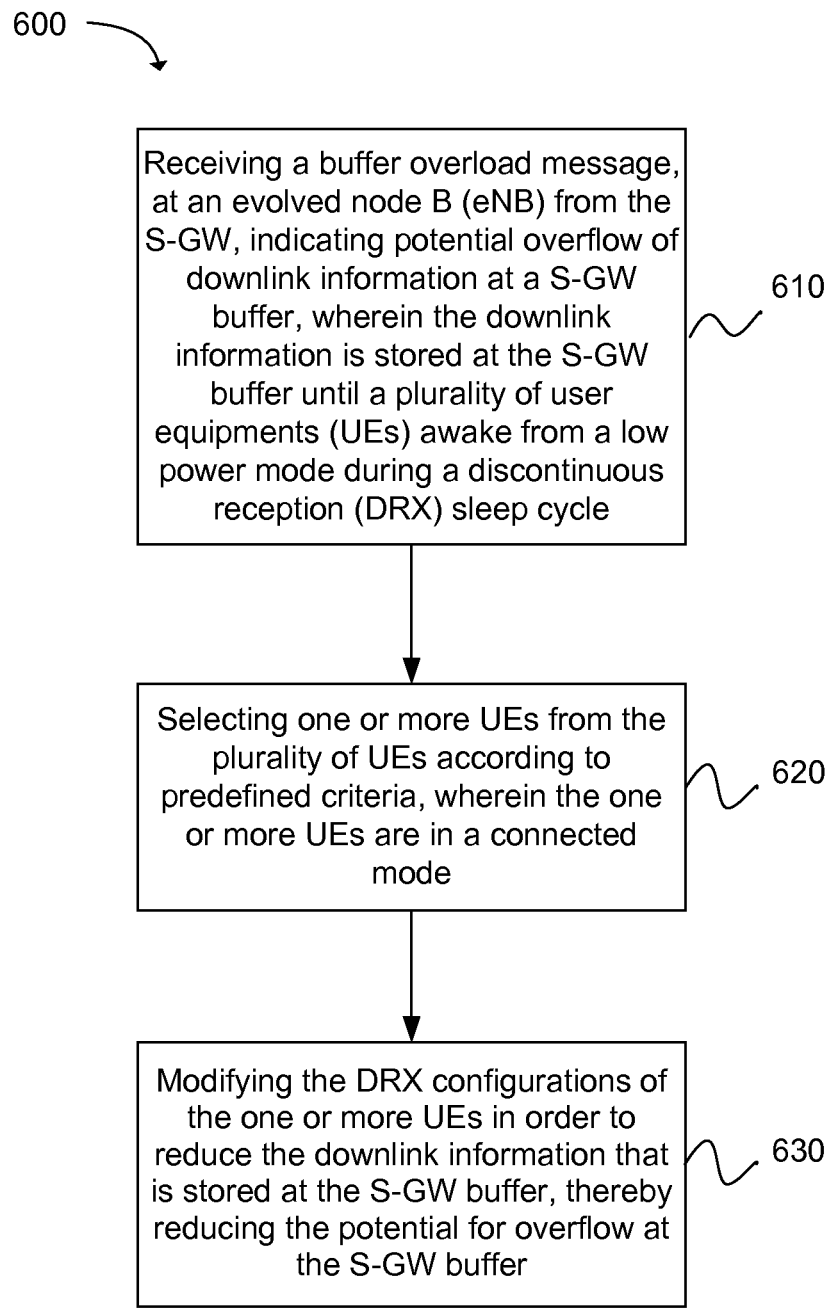
FIG. 6 depicts a flow chart of a method for reducing buffer overflow at a Third Generation Partnership Project (3GPP) Serving Gateway (S-GW) in accordance with an example.

Another example provides functionality 500 of computer circuitry of a Third Generation Partnership Project (3GPP) serving gateway (S-GW) operable to buffer downlink information for a plurality of user equipments (UEs), as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to receive the downlink information for the plurality of UEs, as in block 502. The computer circuitry can be further configured to store the downlink information, at an S-GW buffer, when the plurality of UEs are in a low power mode during a discontinuous reception (DRX) sleep cycle, as in block 520. In addition, the computer circuitry can be further configured to detect an overflow potential at the S-GW buffer when the downlink information stored at the S-GW buffer exceeds a predetermined threshold, as in block 530. Furthermore, the computer circuitry can be configure to communicate a buffer overflow message indicating the overflow potential at the S-GW buffer to an evolved node B (eNB), wherein the buffer overflow message instructs the eNB to modify DRX configurations associated with one or more UEs in the plurality of UEs in order to reduce overflow potential at the S-GW buffer, as in block 540.

In one example, the buffer overflow message instructs the eNB to modify a DRX sleep cycle length of the one or more UEs in order to reduce overflow potential at the S-GW buffer. In an additional example, the one or more UEs are in a connected mode. In one configuration, the computer circuitry can be further configured to communicate the buffer overflow message to the eNB via a mobility management entity (MME). In one example, the plurality of UEs include machine type communication (MTC) devices. In addition, the plurality of UEs include an antenna, a touch sensitive display screen, a speaker, a microphone, a graphics processor, an application processor, internal memory, or a non-volatile memory port.

Another example provides a method 600 for reducing buffer overflow at a Third Generation Partnership Project (3GPP) Serving Gateway (S-GW), as shown in the flow chart in FIG. 6. The method may be executed as instructions on a machine, where the instructions are included on at least one computer readable medium or one non-transitory machine readable storage medium. The method includes the operation of receiving a buffer overflow message, at an evolved node B (eNB) from the S-GW, indicating potential overflow of downlink information at a S-GW buffer, wherein the downlink information is stored at the S-GW buffer until a plurality of user equipments (UEs) awake from a low power mode during a discontinuous reception (DRX) sleep cycle, as in block 610. The method may further include the operation of selecting one or more UEs from the plurality of UEs according to a predefined criteria, wherein the one or more UEs are in a connected mode, as in block 620. The method may also include the operation of modifying the DRX configurations of the one or more UEs in order to reduce the downlink information that is stored at the S-GW buffer, thereby reducing the potential for overflow at the S-GW buffer, as in block 630.

In one example, the method may further include receiving the buffer overflow message from the S-GW when the downlink information that is stored at the S-GW buffer exceeds a predetermined threshold. In addition, the method may further include receiving the buffer overflow message from the S-GW via a mobility management entity (MME).

In one example, the method may further include selecting the one or more UEs based on the predefined criteria relating to a data rate or a DRX cycle length. In one example, modifying the DRX configurations of the one or more UEs comprises reducing a DRX sleep cycle length of the one or more UEs. In an additional example, modifying the DRX configurations of the one or more UEs comprises preventing the one or more UEs from entering a low power mode during a DRX sleep cycle.

Figure 7:
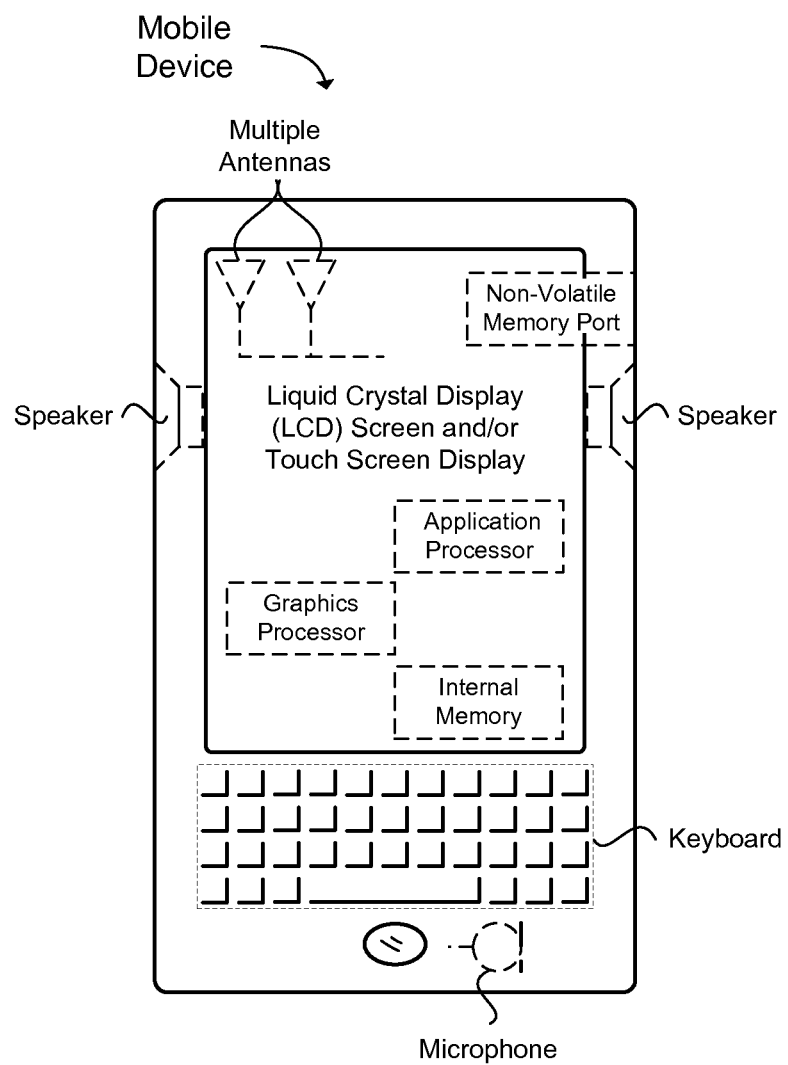
FIG. 7 illustrates a block diagram of a mobile device (e.g., a user equipment) in accordance with an example.

FIG. 7 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 7 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed:

1. A node operable to control discontinuous reception (DRX) configurations for a plurality of user equipments (UEs), the node comprising:
   one or more processors configured to:
      receive a buffer overflow message, from a serving gateway (S-GW) via a mobility management entity (MME), indicating a potential overflow at an S-GW buffer when downlink information that is stored at the S-GW buffer exceeds a predetermined threshold of an S-GW buffer capacity;
      select one or more UEs in idle mode or connected mode from the plurality of UEs according to predefined criteria;
      modify the DRX configurations of the one or more UEs by reducing a DRX sleep cycle length of the one or more UEs in idle or connected mode in response to receiving multiple buffer overflow messages from the S-GW; and
      modify the DRX configurations of the one or more UEs in idle mode or connected mode in order to reduce the downlink information that is stored at the S-GW buffer, thereby reducing the potential for overflow at the S-GW buffer; and
   a memory interface configured to store in a memory the DRX configurations of the one or more UEs.

2. The node of claim 1, wherein the downlink information is stored at the S-GW buffer until the UEs awake from a low power mode during a discontinuous reception (DRX) sleep cycle.

3. The node of claim 1, further configured to select the one or more UEs based on the predefined criteria of a highest data rate or a longest DRX sleep cycle length in comparison to the plurality of UEs.

4. The node of claim 1, further configured to modify the DRX configurations of the one or more UEs that are in a connected mode.

5. The node of claim 1, further configured to modify a DRX sleep cycle length of the one or more UEs when the UEs transition from the idle mode to the connected mode.

6. The node of claim 1, further configured to prevent the one or more UEs from entering a low power mode during a DRX sleep cycle in response to receiving the buffer overflow message from the S-GW.

7. The node of claim 1, further configured to reconfigure DRX sleep cycle lengths of the one or more UEs to a previous DRX configuration in response to receiving an indication from the S-GW that the potential for overflow at the S-GW buffer has ended.

8. The node of claim 1, wherein the node is selected from a group consisting of a base station (BS), a Node B (NB), an evolved Node B (eNB), a baseband unit (BBU), a remote radio head (RRH), a remote radio equipment (RRE), or a remote radio unit (RRU).

9. A Third Generation Partnership Project (3GPP) Serving Gateway (S-GW) operable to buffer downlink information for a plurality of user equipments (UEs) in idle mode or connected mode, the S-GW comprising:
one or more processors configured to:
receive the downlink information for the plurality of UEs;
store the downlink information, at an S-GW buffer, when the plurality of UEs in idle mode or connected mode are in a low power mode during a discontinuous reception (DRX) sleep cycle;
detect an overflow potential at the S-GW buffer when the downlink information stored at the S-GW buffer exceeds a predetermined threshold of an S GW buffer capacity; and
communicate a buffer overflow message indicating the overflow potential at the S-GW buffer to an evolved node B (eNB) via a mobility management entity (MME), wherein the buffer overflow message instructs the eNB to modify DRX configurations associated with one or more UEs in idle mode or connected mode in the plurality of UEs in order to reduce overflow potential at the S-GW buffer and modify the DRX configurations of the one or more UEs by reducing a DRX sleep cycle length of the one or more UEs in idle or connected mode in response to receiving multiple buffer overflow messages from the S-GW; and
a memory interface configured to store in a memory the downlink information of the plurality of UEs.

10. The 3GPPS-GW of claim 9, wherein the buffer overflow message instructs the eNB to modify a DRX sleep cycle length of the one or more UEs in order to reduce overflow potential at the S-GW buffer.

11. The 3GPPS-GW of claim 9, wherein the one or more UEs are in a connected mode.

12. The 3GPPS-GW of claim 9, wherein the plurality of UEs include machine type communication (MTC) devices.

13. The 3GPPS-GW of claim 9, wherein the plurality of UEs include an antenna, a touch sensitive display screen, a speaker, a microphone, a graphics processor, an application processor, internal memory, or a non-volatile memory port.

14. A least one non-transitory machine readable storage medium having instructions embodied thereon for reducing buffer overflow at a Third Generation Partnership Project (3GPP) Serving Gateway (S-GW), the instructions that when executed by at least one processor perform the following:
receiving a buffer overflow message, at an evolved node B (eNB) from the S-GW via a mobility management entity (MME), indicating potential overflow of downlink information at a S-GW buffer, wherein the downlink information is stored at the S-GW buffer until a plurality of user equipments (UEs) awake from a low power mode during a discontinuous reception (DRX) sleep cycle;
selecting one or more UEs in idle or connected mode from the plurality of UEs according to predefined criteria, wherein the one or more UEs are in a connected mode;
modifying the DRX configurations of the one or more UEs by reducing a DRX sleep cycle length of the one or more UEs in idle or connected mode in response to receiving multiple buffer overflow messages from the S-GW; and
modifying the DRX configurations of the one or more UEs in idle mode or connected mode in order to reduce the downlink information that is stored at the S-GW buffer, thereby reducing the potential for overflow at the S-GW buffer.

15. The at least one non-transitory machine readable storage medium of claim 14, further comprising instructions that when executed by the at least one processor performs the following: receiving the buffer overflow message from the S-GW when the downlink information that is stored at the S-GW buffer exceeds a predetermined threshold.

16. The at least one non-transitory machine readable storage medium of claim 14, further comprising instructions that when executed by the at least one processor performs the following: selecting the one or more UEs based on the predefined criteria relating to a data rate or a DRX cycle length.

17. The at least one machine readable storage medium of claim 14, wherein modifying the DRX configurations of the one or more UEs comprises reducing a DRX sleep cycle length of the one or more UEs.

18. The at least one machine readable storage medium of claim 14, wherein modifying the DRX configurations of the one or more UEs comprises preventing the one or more UEs from entering a DRX sleep cycle.

* * * * *